United States Patent [19]
Kataoka et al.

[11] Patent Number: 5,134,426
[45] Date of Patent: Jul. 28, 1992

[54] OPTICAL DEVICE FOR GENERATING PATTERN HAVING UNIFORM LIGHT INTENSITY DISTRIBUTION

[75] Inventors: Keiji Kataoka, Kawagoe; Seiji Yonezawa, Hachioji; Toshio Kaneko, Katsuta, all of Japan

[73] Assignee: Hitachi, Ltd., Tokyo, Japan

[21] Appl. No.: 500,902

[22] Filed: Mar. 29, 1990

[30] Foreign Application Priority Data

Mar. 31, 1989 [JP] Japan .................................. 1-078238

[51] Int. Cl.$^5$ .................................. H04N 1/21
[52] U.S. Cl. .................................. 346/108; 250/336.1; 73/861.41; 372/21; 372/69
[58] Field of Search .................. 346/108; 250/336.1; 73/861.41; 372/21, 22, 27, 69, 20

[56] References Cited

U.S. PATENT DOCUMENTS 4,413,342 11/1983 Cohen et al. ......................... 372/22

*Primary Examiner*—Mark J. Reinhart
*Attorney, Agent, or Firm*—Antonelli, Terry, Stout & Kraus

[57] ABSTRACT

An optical device for illuminating an object with a rectangular pattern having a uniform light intensity distribution includes n ($n \geq 1$) polarization separating elements which a laser beam emitted from a laser source enters and each of which separates the laser beam into two beams in two directions. The angle of separation by the polarization separating element is set to be $2^{(n-1)}$ times of the smallest one of the separation angles of the polarization separating elements used. At least one quarter-wave or half-wave plate is combined with the polarization separating elements. An imaging lens is provided for forming $2^n$ beam spots on the object such as an optical laser disk plate.

11 Claims, 6 Drawing Sheets

OPTICAL DEVICE FOR GENERATING PATTERN HAVING UNIFORM LIGHT INTENSITY DISTRIBUTION

BACKGROUND OF THE INVENTION

The present invention relates to an optical device for generating a rectangular pattern having a uniform light intensity distribution or profile, and more particularly to an optical pattern generating device which is suitable for application to an optical device for particle measurement or an optical recording device.

In the conventional optical device for generating a rectangular pattern from a laser such as He-Ne laser or Ar laser which provides an isotropic light intensity distribution having a Gaussian cross section, the rectangular pattern is usually generated by disposing a cylindrical lens having a uni-directional imaging property on the laser beam side of an imaging lens which converges a laser beam. In this method, however, since the laser beam has a light intensity distribution following a Gaussian distribution, an elongated elliptical pattern as shown in FIG. 1A is generated but a light intensity distribution of the pattern along its major-axis direction or in an x—x' cross section also exhibits a wide Gaussian distribution, as shown in FIG. 1B, which is constant in light intensity over only a narrow range and therefore cannot be regarded as being a uniform rectangular pattern.

For example, in a particle measuring device in which particles are brought into a rectangular area subjected to a focused rectangular light pattern to measure the shape of the particles or the number of the particles, there is encountered an inconvenience that if light intensities in the rectangular light pattern are not uniform, particles passing through a location where the light intensity varies cannot be detected as particles, thereby making it impossible to make a measurement with excellent accuracy.

Also, in an optical recording device using a laser beam, there is generated a recording pattern having an elongated elliptical profile, as shown in FIG. 1A, which is a desired rectangular pattern, that is, the recording pattern has not a satisfactory quality.

As mentioned above, in the case where the conventional rectangular pattern or elliptical pattern the light intensity of a peripheral portion of which is small as compared with that of a central portion thereof is used as illumination light for an object to be detected, there is an inconvenience that the accuracy of detection or measurement is undesirably different between the central and peripheral portions of the pattern.

The above type of techniques are disclosed by, for example, JP-A-51-19918, JP-A-51-84206 and JP-A-49-18304. But, the disclosed techniques only suggest an optical system using a single cylindrical lens or the combination of two cylindrical lenses and do not suggest the feature of the present invention.

SUMMARY OF THE INVENTION

An object of the present invention is to provide a device for generating a predetermined pattern which has a uniform light intensity distribution.

Another object of the present invention is to provide a light pattern generating device which is suitable for optical read-out or optical write in an optical recording/reproducing device.

A further object of the present invention is to provide a light pattern generating device which is suitable for illumination of red blood corpuscles or dusts to detect the number or shape thereof.

According to one feature of the present invention for attaining the above object, one or more polarization separating or diverging elements are disposed in a laser beam, a quarter-wave ($\lambda/4$) or half-wave ($\lambda/2$) plate is disposed on the entrance side of the polarization separating element, the successive polarization separating elements are set up such that the angle of separation or divergence for orthogonal polarized components is decreased a half by a half or increased a double by a double or such that the decreasing and increasing separation angles coexist, and laser beams emanating from the last polarization separating element are focused by an imaging lens to generate a multiplicity of spots in which adjacent spots partially overlap each other, thereby generating a rectangular pattern which has a uniform light intensity distribution in a major-axis direction of the pattern.

According to another feature of the present invention, a laser beam is made incident upon an array of cylindrical lenses so that diffracted lights emanating from the lens array are condensed to form an area having a uniform light intensity distribution, a rectangular slit is disposed in that area, and an image of the rectangular slit is projected onto an object to be illuminated so that a rectangular pattern having a uniform light intensity distribution is formed on the object.

DESCRIPTION OF THE PREFERRED EMBODIMENTS

Figure 1A:
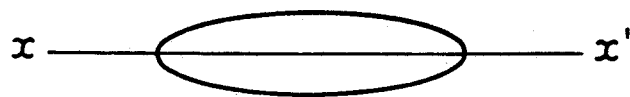
FIGS. 1A and 1B are views showing the shape of the conventional light pattern, more particularly, FIG. 1A showing a light pattern at an imaging plane and FIG. 1B showing a light,, intensity distribution of the light pattern x—x' cross section.
Figure 1B:
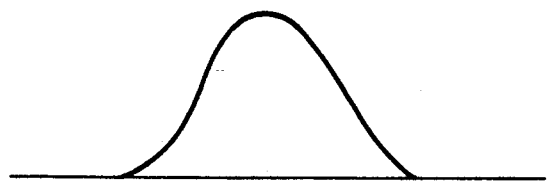
Figure 2A:
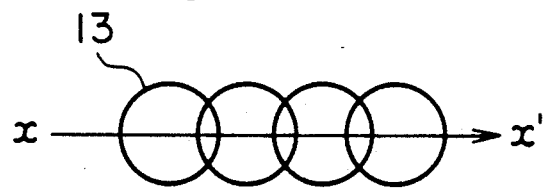
FIGS. 2a and 2B are views showing the shape of a light pattern according to the present invention, more particularly, FIG. 2a a light pattern at an imaging plane and FIG. 2B showing a light pattern in an x—x' plane.
Figure 2B:
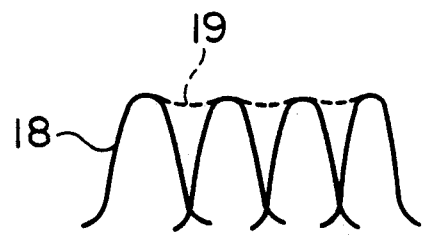

An embodiment of a pattern generating device according to the present invention for generating a rectangular pattern will now be explained. In the device according to the present embodiment, a plurality of circular spots 13 are arranged on an image plane so that adjacent ones thereof partially overlap each other, as shown in FIG. 2A. With such arrangement of circular spots, a light intensity distribution in an x—x' cross section has a profile, as shown by dotted line 19 in FIG. 2B, which includes the superposition of light intensity profiles 18 of the respective circular spots, that is, a rectangular pattern having a substantially uniform light intensity distribution in an x—x' direction (or major-axis direction) is obtained.

Figure 3:
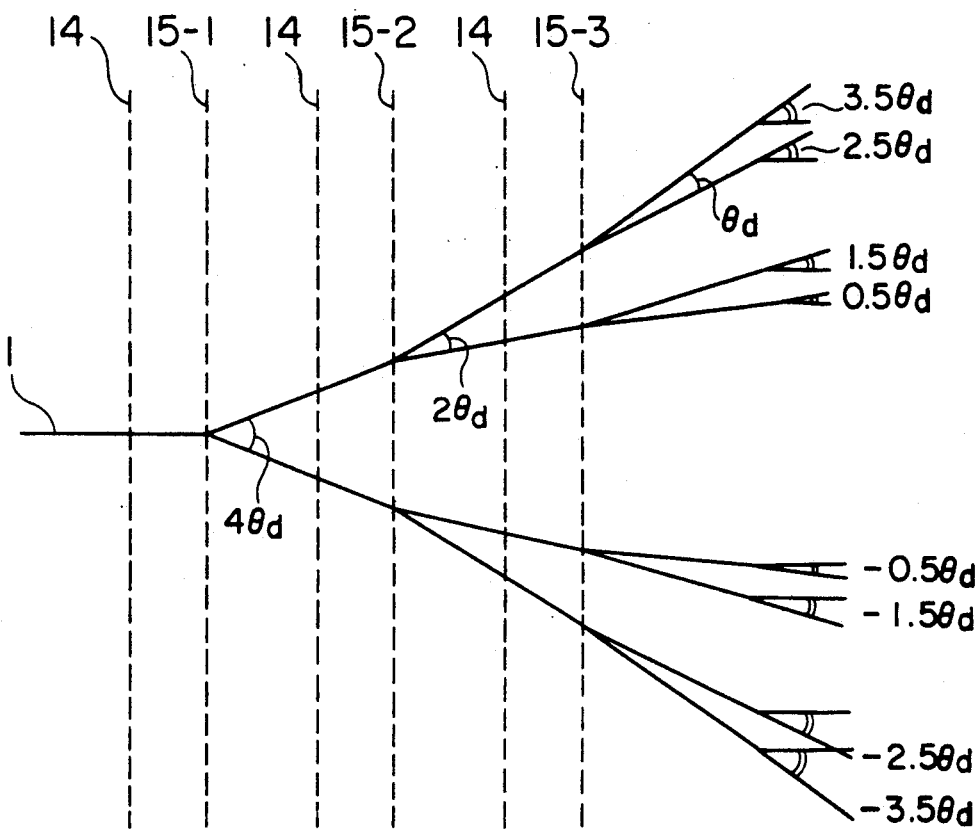
FIG. 3 is a diagram of an optical system in which a of polarization separating elements are used to form a rectangular pattern having a uniform light intensity distribution.

To realize such a multiplicity of spots, according to one feature of the present invention, polarization separating or diverging elements in a multi-stage arrangement or in tandems are used. The polarization separating element may be, for example, an Wollaston prism. FIG. 3 is a diagram for explaining a change of the angle of deflection or separation of a laser beam in the case where three Wollaston prisms are arranged at positions 15-1, 15-2 and 15-3. In the figure, a quarter-wave ($\lambda/4$) plate is disposed at each of positions 14. If a linearly polarized laser beam 1 is incident, the laser beam is first converted into a circularly polarized light by the first quarter-waver plate 14. In the case where the incident laser beam 1 is a circularly polarized light or a linearly polarized light which is inclined at 45° with respect to an optical axis, the quarter-wave plate disposed on the entrance side is not required though the quarter-wave plate disposed between the polarization diverging elements is necessary. The first Wollaston prism 15-1 is set up to separate or diverge two orthogonal polarized components of the laser light from each other by an angle of $4\theta_d$. The two separated orthogonal polarized laser beam components enter the second quarter-wave plate 14 and are respectively coverted into circularly polarized lights thereby. The second Wollaston prism 15-2 is set up to separate two orthogonal polarized components of each of the incident laser beams from the second quarter-wave plate 14 from each other by an angle of $2\theta_d$. The separated beam components are passed through the third quarter-wave plate 14 and enter the third Wollaston prism 15-3. The third Wollaston prism 15-3 is set up to separate orthogonal polarized components of each of the incident laser beams from the third quarter-wave plate 14 from each other by an angle of $\theta_d$. In the shown example, one incident laser beam is thus separated into eight laser beams which have the separation angle of $\theta_d$ between adjacent beams.

Figure 4:
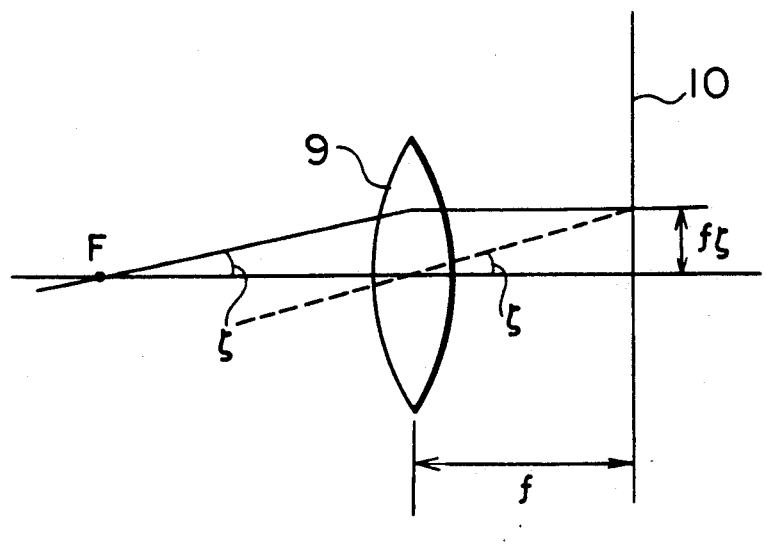
FIG. 4 is for explaining the operation of an lens for focusing beams from the polarization separating optical system shown in FIG. 3.

FIG. 4 is a view for explaining the operation of an imaging lens 9 which focuses beams from the polarization separating optical system shown in FIG. 3. A laser beam having an angle $\phi$ with respect to an optical axis of the imaging lens 9 is focused as a spot into a position which is on an image plane at the focal position F of the imaging lens and is distanced from the optical axis by $f_{10\phi}$, provided that the focal length of the imaging lens 9 is f. Accordingly, if laser beams emanating from an optical system including a multi-stage arrangement of Wollaston prisms as shown in FIG. 3 are focused by the imaging lens 9 of FIG. 4 to form spots on the image plane, an array of spots as shown in FIG. 2A are formed in which adjacent spots partially overlap each other. In the shown example, the number of spots is 8 ($=2^3$) and the spots are arranged at the pitch of $p = fx\theta_d$.

Figure 5:
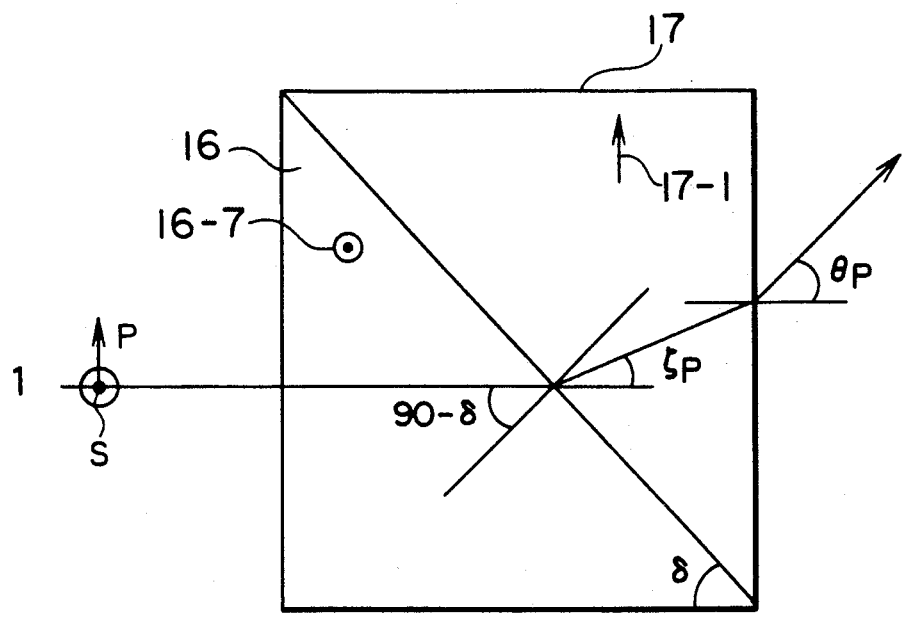
FIG. 5 is a view for explaining the principle of the operation of an prism as a polarization separating element.

Next, the principle of the operation of the Wollaston prism and an embodiment of the present invention will be shown by use of FIG. 5. Now, assume that a laser beam 1 incident upon the Wollaston prism has P and S polarized components. FIG. 5 illustrates the transmission characteristic of the P polarized component. The Wollaston prism is made of the combination or lamination of two quartz crystals 16 and 17 which have different crystal axes. In FIG. 5, it is assumed that the z axes of the two crystals 16 and 17 are directions indicated by 16-1 and 17-1, respectively. In the case where the P polarized light enters the Wollaston prism, the refractive index of the crystal 16 exhibits the index $n_o$ of refraction for ordinary rays and the refractive index of the crystal 17 exhibits the index $n_e$ of refraction for extraordinary rays. In the case where the S polarized light enters the Wollaston prism, the crystal 16 exhibits $n_e$ and the crystal 17 exhibits $n_o$. The refractive indices of the quartz crystal for light having a wavelength of 458 nm are as follows:

$$n_e = 1.561110$$

$$n_o = 1.551753$$

In the case where the P polarized light enters the Wollaston prism, the law of refraction provides the following relation:

$$n_o \sin(90° - \delta) = n_e \sin(90° - \delta - \psi_P) \quad (1)$$

Provided that $\psi_P \ll 1$, the following equation (2) can be derived from the equation (1):

$$\psi_P = \left(\frac{n_e - n_o}{n_e}\right)\left(\frac{1}{\tan\delta}\right). \quad (2)$$

Further, the law of refraction provides the following relation:

$$n_e \sin \psi_P = \sin \theta_P.$$

Provided that $\theta_P \ll 1$, the following relation is satisfied:

$$\theta_P = (n_e - n_o)/\tan\delta. \quad (3)$$

On the other hand, in the case where the S polarized light enters the Wollaston prism, one obtains the relation of $$\theta_S = (n_o - n_e)/\tan\delta \quad (4)$$

wherein $\theta_S$ is an angle at which the S polarized light emanates from the Wollaston prism. Accordingly, the polarization separating or diverging angle $\theta_b$ for the P polarized light and the S polarized light which is defined by $\theta_P - \theta_S$ can be determined as $$\theta_b = \theta_P - \theta_S = 2(n_e - n_o)/\tan\theta. \quad (5)$$

Now, assume that the imaging lens 9 shown in FIG. 4 has the following dimensions or specifications:
focal distance: f=2.1 mm
numerical aperture: $n_a$=0.9
wavelength: $\lambda$=458 nm.
The beam diameter D of one light spot obtained on the image plane through this lens is $$D = 1.22\lambda/n_a.$$

Provided that the pitch p of the array of light spots formed on the image plane is set to be in the order of D/2, the spot array can be approximated to a rectangular pattern.

Provided that the separation angle of each laser beam emanating from the last stage of Wollaston prism is $\theta_d$, it is sufficient to set $\theta_d$ so as to satisfy $$f \times \theta_d = p.$$

One obtains
$\theta_d$=0.0001478 rad.

The parameter $\delta$ which defines the shape of an Wollaston prism providing polarization separating angles $\theta_d$, $2\theta_d$, $4\theta_d$, $8\theta_d$, $16\theta_d$ and $32\theta_d$ is determined from the equation (5) as follows:

$$\theta_d \ldots \delta = 89.547° \quad (6)$$
$$2\theta_d \ldots \delta = 89.095°$$
$$4\theta_d \ldots \delta = 88.190°$$
$$8\theta_d \ldots \delta = 86.384°$$
$$16\theta_d \ldots \delta = 82.797°$$
$$32\theta_d \ldots \delta = 75.815°.$$

In the case where it is desired to separate one beam into eight light spots as shown in FIG. 3, Wollaston prisms assembled with the angles $\delta$ determined by the equation (6) corresponding to $4\theta_d$, $2\theta_d$ and $\theta_d$ are used. In the case where the separation into sixteen light spots is desired, Wollaston prisms assembled with the angles $\delta$ determined by the equation (6) corresponding to $8\theta_d$, $4\theta_d$, $2\theta_d$ and $\theta_d$ are used. In the case where the separation into thirty two light spots is desired, Wollaston prisms assembled with the angles $\delta$ determined by the equation (6) corresponding to $16\theta_d$, $8\theta_d$, $4\theta_d$, $2\theta_d$ and $\theta_d$ are used. In the case where the separation into sixty four light spots is desired, Wollaston prisms assembled with the angles $\delta$ determined by the equation (6) corresponding to $32\theta_d$, $16\theta_d$, $8\theta_d$, $4\theta_d$, $2\theta_d$ and $\theta_d$ are used.

In the embodiment shown in conjunction with FIG. 3, three polarization separating elements are used and the angle of deflection or separation is decreased a half by a half as $4\theta_d \to 2\theta_d \to \theta_d$. However, it is possible to make a construction in which the angle of separation is increased a double by a double or the increasing and decreasing separation angles coexist. Also, it is possible to use half-wave ($=/2$) plates in place of the quarter-wave ($=/4$) plates.

Figure 6:
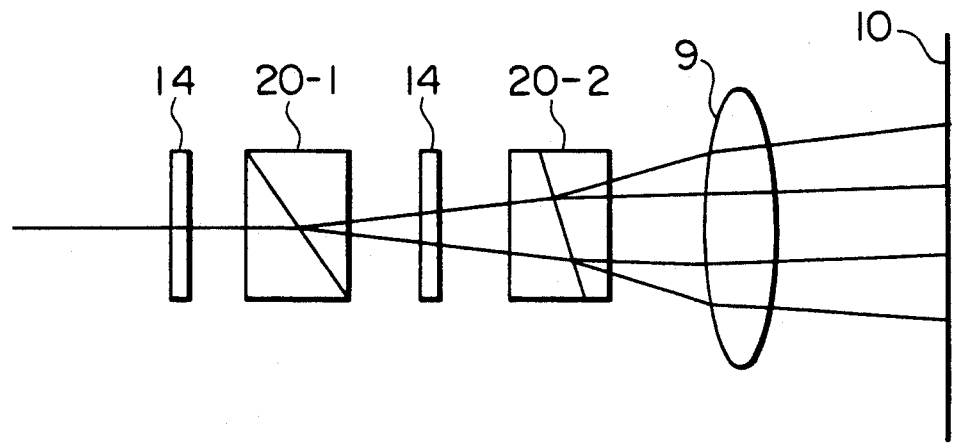
FIG. 6 is an optical block diagram showing an embodiment of a pattern optical device for forming a rectangular pattern by use of the optical system shown in FIG. 3.
Figure 7:
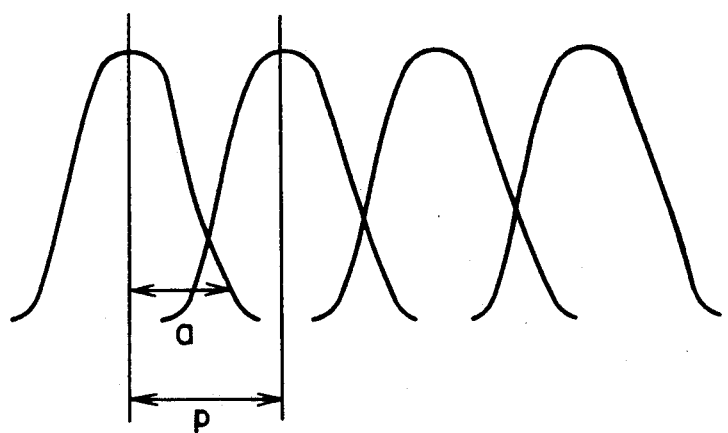
FIG. 7 is a graph for explaining a condition in which a plurality of light spots formed on an imaging plane partially other.

FIG. 6 is an optical block diagram showing an embodiment in which the polarization separating optical system shown in FIG. 3 is used. An incident laser beam 1 enters a first quarter-wave plate 14 by which the beam is converted into a circularly polarized beam. The circularly polarized beam enters a first Wollaston prism 20-1 by which the beam is separated or diverged into two beams. For example, the Wollaston prism 20-1 is set up to provide the separation at the angle of $2\theta_d$ or the prism is assembled with the angle $\delta$=89.095° determined by the equation (6). Since the directions of polarization of the two separate beams emanating from the first Wollaston prism 20-1 are orthogonal to each other, those beams are passed through a second quarter-wave plate 14 so that each beam is converted into a circularly polarized beam which in turn is passed through a second Wollaston prism 20-2. For example, the second Wollaston prism 20-2 is set up to provide the separation at the angle of $\theta_d$ or the prism is assembled with the angle $\delta$=89.547° determined by the equation (6). Laser beams emanating from the second Wollaston prism 20-2 are passed through an imaging lens 9 so that a rectangular pattern including an array of four spots is formed on an image plane 10. In the foregoing embodiment in which the polarization separating elements are used, it is important that adjacent ones of a plurality of light spots partially overlap each other. The condition for superposition of the light spots will now be described in reference to FIG. 7.

In the case where circular light spots each having a light amplitude distribution of $$\exp\left(-\left(\frac{x}{a}\right)^2\right)$$

(or a light intensity distribution of $$\exp\left(-2\left(\frac{x}{a}\right)^2\right))$$

are arranged at a pitch of p so that the spots partially overlap each other, we will determine a relation between the degree a of spreading of the light spot and the pitch p which provides a uniform light intensity distribution. When N spots are superposed, the light intensity distribution I(x) is determined by the following equation:

$$I(x) = \left(\sum_{n=0}^{N-1} \exp\left(-\left(\frac{x-np}{a}\right)^2\right)\right)^2.$$

Provided that N is 10 and the variation V of light intensities in the vicinity of the central portion is defined by $$V = \frac{\{I(x=4P) - I(x=4.5P)\}}{\{I(x=4P) + I(x=4.5P)\}},$$

the results of calculation give the following:

| a/p | V |
| --- | --- |
| 0.1 | 1 |
| 0.2 | 1 |
| 0.3 | 0.9995 |
| 0.4 | 0.941 |

-continued

| a/p | V |
|---|---|
| 0.5 | 0.595 |
| 0.6 | 0.225 |
| 0.7 | 0.063 |
| 0.8 | 0.014 |
| 0.9 | 0.0027 |
| 1.0 | $4.14 \times 10^{-4}$ |
| 1.1 | $5.2 \times 10^{-5}$ |

Accordingly, in order to suppress the variation V to a value not greater than 50%, it is preferable that the spots overlap to satisfy a relation of $a/p > 0.5$.

Figure 8A:
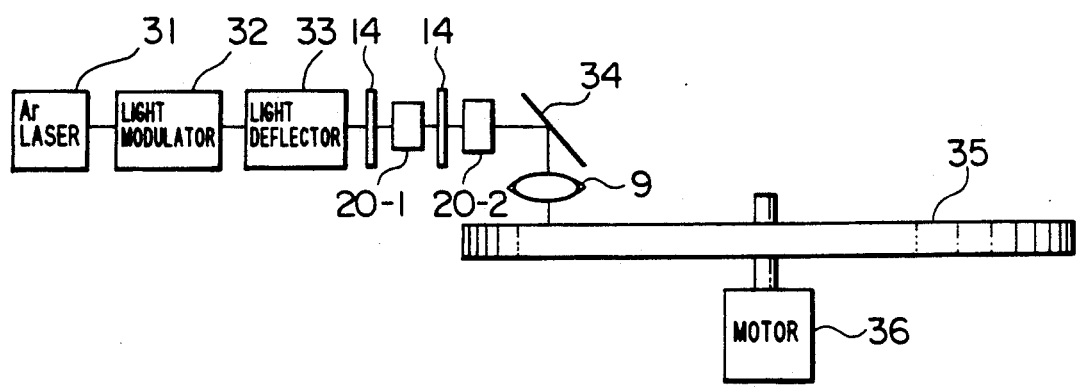
FIGS. 8A and 8B respectively show a schematic block diagram of an optical system and a plan view of an optical disk plate in the case where the present invention is applied t optical disk device.
Figure 8B:
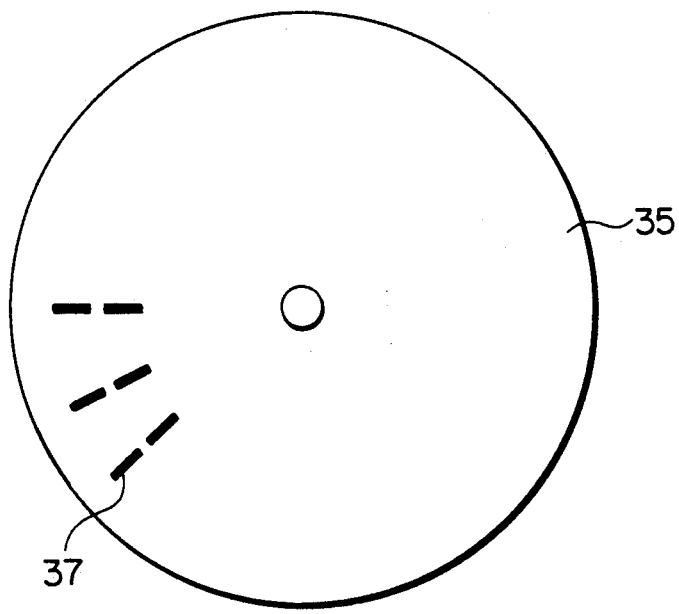

FIGS. 8A and 8B show an example in which a rectangular pattern having a uniform light intensity distribution obtained using the polarization separating elements shown in conjunction with the foregoing embodiment is used in an optical disk device. A laser beam emitted from an Ar laser 31 is passed through a light modulator 32 and a light deflector 33 and emanates from a polarization separating optical system, as shown in FIG. 6, which includes quarter-wave plates 14 and Wollaston prisms 20-1 and 20-2. The light modulator 32 is provided for modulating the laser beam to produce a recording pattern on a disk 35. The light deflector 33 is provided for subjecting a pattern recorded along a track on the disk to small displacement in a direction perpendicular to the track, thereby recording, for example, a pattern of wobble bits. In the case where there is no need of displacing the pattern, the light deflector 33 is not required. The laser beams emanating from the Wollaston prism 20-2 are reflected by a mirror 34 and are thereafter passed through an objective lens 9 to form light spots on the disk 35. The light spots provide a rectangular spot array pattern as has already been mentioned in conjunction with FIGS. 2A, 2B and 7. Since it is possible to rotate the disk 35 by a motor 36, optical recording along the track can be effected. If the disk or the optical system is displaced in the radius direction of the disk by means of a proper mechanism (not shown), optical recording along different tracks can be effected. FIG. 8B shows in exaggeration an example of rectangular patterns 37 along tracks on the disk.

Figure 9:
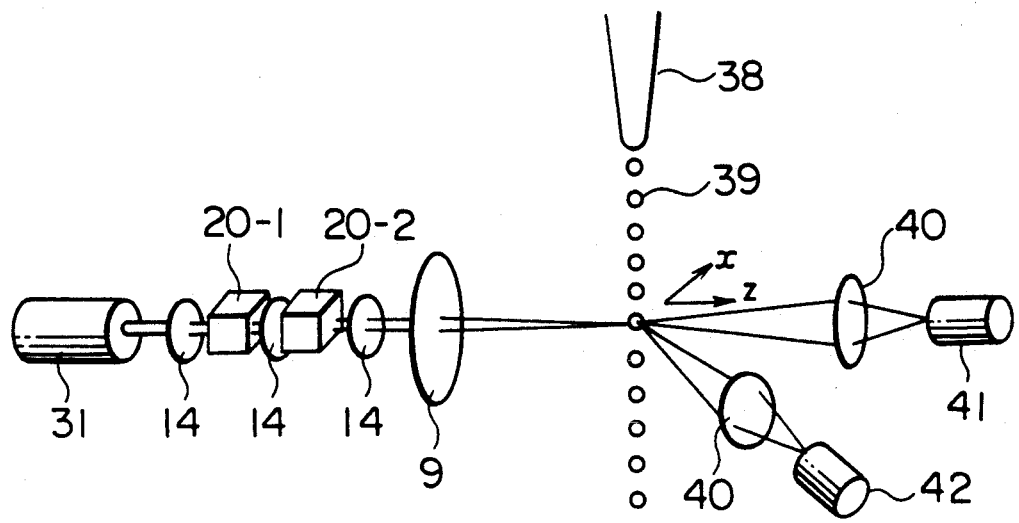
FIG. 9 is showing the construction of an optical system the case where the present invention is applied to a device.

FIG. 9 shows an example in which a rectangular pattern having a uniform light intensity distribution obtained using the polarization separating elements shown in conjunction with the foregoing embodiment is used in a particle measuring device which measures the shape of red blood corpuscles in the blood, the number of dusts in the air, or the like. In this device, properly diluted particles are ejected from a nozzle 38 and are brought to an area subjected to a focused laser spot array. A laser beam emitted from an Ar laser 31 is passed through the above-mentioned polarization separating optical element including a first quarter-wave plate 14 and a first Wollaston prism 20-1, a second quarter-wave plate 14 and a second Wollaston prism 20-2. Laser beams emanating from the polarization separating optical system are passed through a third quarter-wave plate 14 and are then focused as spots by an imaging lens 9 to the vicinity of a position through which the particles pass. The focused spots provide a rectangular pattern having a light intensity distribution which is uniform in the x direction. Therefore, even if the passage position of particles encounters a small displacement in the x direction, measurement with high accuracy is possible since the particles pass through a portion where a change in light intensities is small. Information concerning the shape or the number of particles is obtained by converging scattered lights from the particles by lenses 40 and receiving them by photomultipliers 41 and 42. Unlike the optical system shown in FIG. 6, the third quarter-wave plate 14 is disposed immediately before the imaging lens 9 in order that each of orthogonal linearly polarized lights emanating from the second or last Wollaston prism is converted into a circularly polarized light, thereby averaging the polarization dependency of scattered lights from the particles.

Figure 10A:
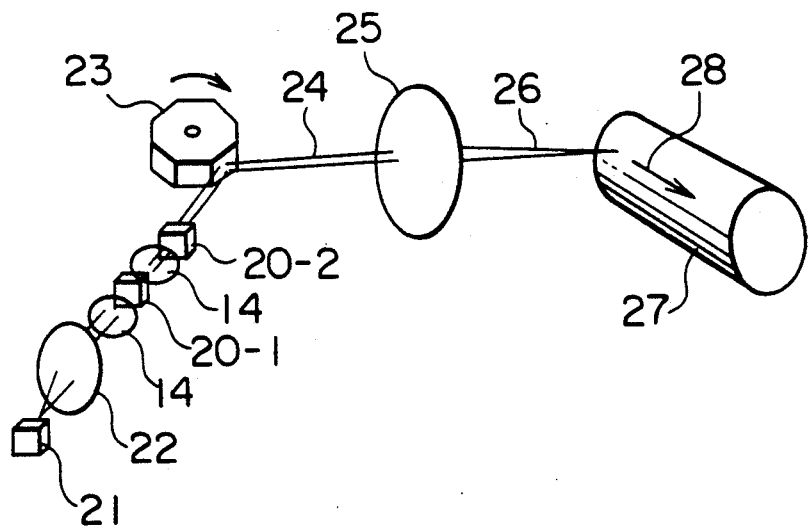
FIGS. 10A and 10B show an example in which a rectangular pattern having a uniform light intensity distribution obtained using polarization separating elements shown in the embodiment is used in a laser printer.
Figure 10B:
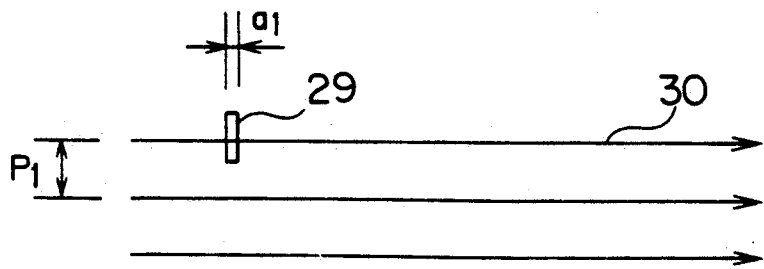

FIGS. 10A and 10B show an example in which a rectangular pattern having a uniform light intensity distribution obtained using the polarization separating elements shown in conjunction with the foregoing embodiment is used in a laser printer. A laser beam emitted from a semiconductor laser 21 is collimated by a coupling lens 22 and is passed through a polarization separating optical system which includes two quarter-wave plates 14 and two Wollaston prisms 20-1 and 20-2. Laser beams emanating from the polarization separating optical system are optically scanned by a rotating polygon mirror 23. The scanned beams are focused as light spots on a photosensitive drum 27 by an imaging lens 25. The focused light spots are scanned in a direction indicated by arrow 28. FIG. 10B shows the situation of scan of the photosensitive drum 27 with a rectangular pattern 29. The rectangular pattern 29 scans the photosensitive drum 27 in a direction indicated by arrow 30. The spot size $a_1$ of the narrower dimension of the rectangular pattern 29 determines a resolution in a direction of scanning line.

In the case where the pitch $p_1$ of scanning lines determined for the printer device is greater than the resolution $a_1$ in the scanning line direction, optical recording with a circular pattern having a light spot size $a_1$ does not yield high-definition printing since a gap where printing is not made is produced between adjacent scanning lines, but optical recording with the rectangular pattern 29 as shown in FIG. 10B enables high-definition printing which has no gap between scanning lines.

In the foregoing explanation, an Wollaston prism has been used as the polarization separating element. However, a Rochen prism, a Sénarmont prism or the like may be used in place of the Wollaston prism.

Figure 11A:
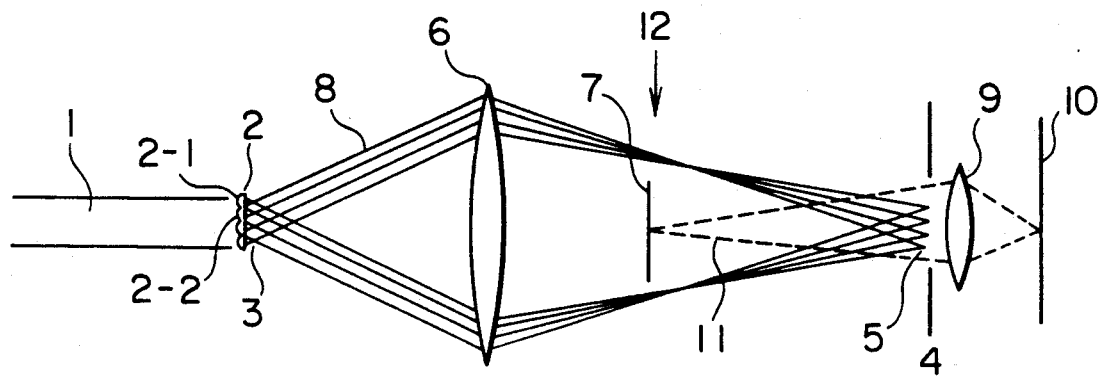
FIGS. 11A, 11B and 13 show another embodiment of the present invention in which an array of cylindrical lenses is used, more particularly, FIG. 11A being a of an optical system viewed from a side 11B being a plan view of the optical system viewed from a top face, FIG. 12 being a perspective view showing the cylindrical lens array, and FIG. 13 being a perspective view showing a rectangular slit plate.
Figure 11B:
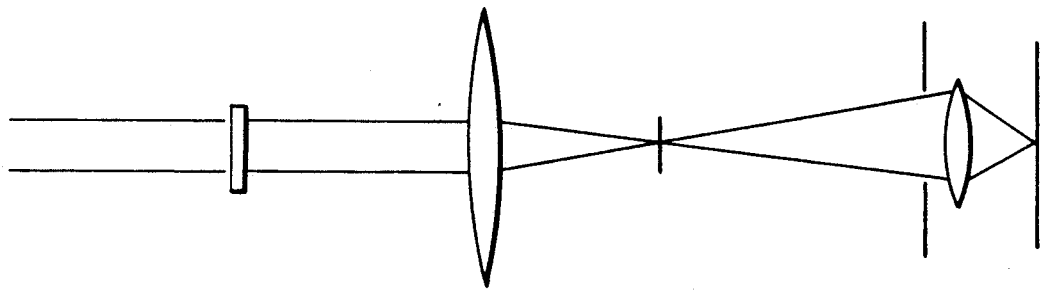
Figure 12:
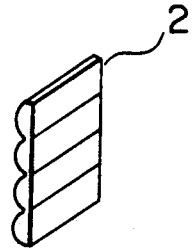
Figure 13:
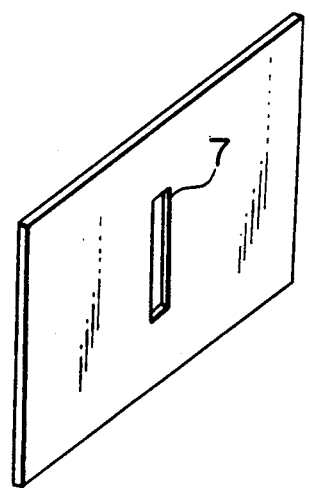

FIGS. 11A, 11B, 12 and 13 show another embodiment of the present invention in which an array of cylindrical lenses is used. FIG. 11a is a schematic diagram of an optical system viewed from a side face and FIG. 11B is a plan view of the optical system viewed from a top face. An incident laser beam 1 enters an array of cylindrical lenses 12 as shown in FIG. 12 and a row of spots 3 produced by the cylindrical lens array 2 are imaged at an entrance pupil 4 of an imaging lens 9 by a condenser lens 6. Even if a light intensity distribution in the cross section of the incident laser beam has a Gaussian distribution, a uniform light intensity distribution can be realized in the vicinity 12 of a focal position of the condenser lens 6. Namely, for example, though weak light in a skirt portion of the Gaussian distribution enters a cylindrical lens 2-1 in the cylindrical lens array 2 and intense light in a central portion of the Gaussian distribution enters a cylindrical lens 2-2, both the lights overlap at the substantially same location at the focal position 12 of the condenser lens 6 so that a uniform light intensity distribution is realized. If a rectangular slit 7 shown in FIG. 13 is disposed at the focal position 12 of the condenser lens 6, light intensities in a direction shown in FIG. 11A become substantially uniform on the slit. For a direction shown in FIG. 11B, since the width of the slit in that direction is narrow and light is expanded as the effect of diffraction, light intensities on the slit are uniform. Thus, since light intensities on the slit 7 are uniform, a pattern obtained by imaging a light pattern passed through the slit 7 onto an image plane 10 by the imaging lens 9 also provides a uniform rectangular pattern.

Though the applicability of the present invention to an optical disk device, a particle measuring device and a laser printer has been described in reference to FIGS. 8A, 9 and 10, the embodiment shown in FIG. 11A is also applicable to an optical disk device, a particle measuring device and a laser printer.

We claim:

1. An optical device comprising:
   a laser source for generating a laser beam;
   an object to be illuminated;
   n ($n \geq 1$) polarization separating elements which the laser beam from said laser source enters, each of said polarization separating elements separating the laser beam into two beams in two directions, the angle of separation by the polarization separating element being set to be $2^{(n-1)}$ times of the smallest one of the separation angles of the polarization separating elements used;
   at least one 1/m-wave plate combined with said polarization separating elements; and
   an imaging lens for forming $2^n$ beam spots on said object to be illuminated.

2. An optical device according to Claim 1, wherein in order that adjacent ones of said $2^n$ beam spots partially overlap each other, said separation angle is set to satisfy a relation of $a/p > 0.5$ wherein a is the degree of spreading of a light spot and p is the pitch of light spots.

3. An optical device according to Claim 1, wherein m in said 1/m-wave plate is 4 and/or 2.

4. An optical device according to Claim 1, wherein said polarization separating element includes a Wollaston prism.

5. An optical device according to Claim 1, wherein said polarization separating element includes a Rochen prism.

6. An optical device according to Claim 1, wherein said polarization separating element includes a Sénarmont prism.

7. A device for detecting the shape and/or the number of particles, comprising:
   a laser source for generating a laser beam;
   particles as an object to be illuminated;
   n ($n \geq 1$) polarization separating elements which the laser beam from said laser source enters, each of said polarization separating elements separating the laser beam into two beams in two directions, the angle of separation by the polarization separating element being set to be $2^{(n-1)}$ times of the smallest one of the separation angles of the polarization separating elements used;
   at least one 1/m-wave plate combined with said polarization separating elements;
   an imaging lens for forming $2^n$ beam spots and illuminating said particles with said beam spots; and
   light detecting means for detecting light reflected from said particles.

8. A device for recording and/or reproducing information on/from an optical recording medium, comprising:
   a laser source for generating a laser beam;
   an optical recording medium as an object to be illuminated;
   n ($n \geq 1$) polarization separating elements which the laser beam from said laser source enters, each of said polarization separating elements separating the laser beam into two beams in two directions, the angle of separation by the polarization separating element being set to be $2^{(n-1)}$ times of the smallest one of the separation angles of the polarization separating elements used;
   at least one 1/m-wave plate combined with said polarization separating elements; and
   an imaging lens for forming $2^n$ beam spots on said optical recording medium.

9. An optical device according to claim 1, wherein the optical device enables generation of a pattern having a substantially uniform light intensity distribution.

10. An optical device according to claim 1, wherein the optical device enables detection of at least one of a shape and number of particles, the object to be illuminated being the particles, the imaging lens illuminating the particles with the beam spots, and further comprising light detecting means for detecting light reflected from the particles.

11. An optical device according to claim 1, wherein the optical device enables at least one of recording and reproduction of information on/from an optical recording medium as the object to be illuminated, the imaging lens forming the beam spots on the optical recording medium.

* * * * *